United States Patent
Khoshnevisan et al.

(10) Patent No.: US 12,238,037 B2
(45) Date of Patent: Feb. 25, 2025

(54) PORT GROUP PAIRING FOR CHANNEL STATE INFORMATION IN MULTI-TRANSMIT RECEIVE POINT DEPLOYMENTS

(71) Applicant: QUALCOMM Incorporated, San Diego, CA (US)

(72) Inventors: Mostafa Khoshnevisan, San Diego, CA (US); Chenxi Hao, Beijing (CN); Xiaoxia Zhang, San Diego, CA (US); Yu Zhang, San Diego, CA (US); Hao Xu, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/758,664

(22) PCT Filed: Jan. 31, 2020

(86) PCT No.: PCT/CN2020/074097
§ 371 (c)(1),
(2) Date: Jul. 12, 2022

(87) PCT Pub. No.: WO2021/151239
PCT Pub. Date: Aug. 5, 2021

(65) Prior Publication Data
US 2023/0054935 A1    Feb. 23, 2023

(51) Int. Cl.
*H04L 12/28* (2006.01)
*H04L 5/00* (2006.01)
*H04B 7/06* (2006.01)

(52) U.S. Cl.
CPC .......... *H04L 5/0057* (2013.01); *H04L 5/0035* (2013.01); *H04L 5/0051* (2013.01); *H04B 7/0626* (2013.01)

(58) Field of Classification Search
CPC ..................................................... H04L 5/0057
(Continued)

(56) References Cited

U.S. PATENT DOCUMENTS

| | | | |
|---|---|---|---|
| 2019/0222284 A1 | 7/2019 | Huang | |
| 2019/0222357 A1 | 7/2019 | Huang et al. | |
| 2023/0318669 A1* | 10/2023 | Ly | H04B 7/06956 375/262 |

FOREIGN PATENT DOCUMENTS

| | | |
|---|---|---|
| CN | 110474730 A | 11/2019 |
| CN | 110475262 A | 11/2019 |
| EP | 3565172 A1 | 11/2019 |

OTHER PUBLICATIONS

LG Electronics: Enhancements on Multi-TRP/Panel Transmission, 3GPP Draft, R1-1910582, 3GPP TSG RAN WG1 Meeting #98bis, 3rd Generation Partnership Project, Mobile Competence Centre, 650, Route Des Lucioles, F-06921 Sophia-Antipolis Cedex, France, vol. RAN WG1, No. Chongqing, China, 20191014-20191020, Oct. 5, 2019, XP051808599, 23 Pages. p. 17, section 2.

(Continued)

*Primary Examiner* — Dang T Ton
(74) *Attorney, Agent, or Firm* — Harrity & Harrity, LLP (57) ABSTRACT

Various aspects of the present disclosure generally relate to wireless communication. In some aspects, a user equipment (UE) may identify a plurality of resource sets, wherein a resource set, of the plurality of resource sets, includes one or more type-0 resources and one or more type-1 resources, wherein the one or more type-0 resources are configured with a single transmission configuration indicator (TCI) state and the one or more type-1 resources are configured with at least two TCI states; identify a plurality of hypotheses; identify a set of hypothesis groups, wherein the plurality of hypotheses are divided into the set of hypothesis groups; and report, to one or more transmit receive points (Continued)

(TRPs) and for the set of hypothesis groups, a set of channel state information (CSIs) corresponding to the set of hypothesis groups. Numerous other aspects are provided.

20 Claims, 4 Drawing Sheets

(58) Field of Classification Search
USPC .................................. 370/329, 400, 403
See application file for complete search history.

(56) References Cited

OTHER PUBLICATIONS

Supplementary European Search Report—EP20916463—Search Authority—The Hague—Sep. 19, 2023.

International Search Report and Written Opinion—PCT/CN2020/074097—ISA/EPO—Oct. 28, 2020.

NTT DOCOMO, Inc: "Discussion on Multi-Beam Enhancement", 3GPP Draft, 3GPP TSG RAN WG1 #98bis, R1-1911185, 3RD Generation Partnership Project (3GPP), Mobile Competence Centre, 650, Route Des Lucioles, F-06921, Sophia-Antipolis Cedex, France, vol. RAN WG1, No. Chongqing, China, 20191014-20191020, Oct. 4, 2019 (Oct. 4, 2019), XP051789957, pp. 1-20, Retrieved from the Internet: URL: http://www.3gpp.org/ftp/tsg_ran/WG1_RL1/TSGR1_98b/Docs/R1-1911185.zip R1-1911185.docx [retrieved on Oct. 4, 2019] Section 3.3, p. 4, paragraph [03.3]—p. 5, pp. 3-4, Section 3.2.

NTT DOCOMO Inc: "Enhancements on Multi-TRP/Panel Transmission", 3GPP Draft, 3GPP TSG RAN WG1 #98bis, R1-1911184, 3rd Generation Partnership Project (3GPP), Mobile Competence Centre, 650, Route Des Lucioles, F-06921 Sophia-Antipolis Cedex, France, vol. RAN WG1, No. Chongqing, China, 20191014-20191020, Oct. 4, 2019 (Oct. 4, 2019) 32 Pages.

\* cited by examiner

PORT GROUP PAIRING FOR CHANNEL STATE INFORMATION IN MULTI-TRANSMIT RECEIVE POINT DEPLOYMENTS

CROSS-REFERENCE TO RELATED APPLICATION

This Application is a 371 National Stage of PCT Application No. PCT/CN2020/074097 filed on Jan. 31, 2020, entitled "PORT GROUP PAIRING FOR CHANNEL STATE INFORMATION IN MULTI-TRANSMIT RECEIVE POINT DEPLOYMENTS," which is hereby expressly incorporated by reference herein.

FIELD OF THE DISCLOSURE

Aspects of the present disclosure generally relate to wireless communication and to techniques and apparatuses for port group pairing for channel state information (CSI) in multi-transmit receive point (TRP) deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a plurality of resource sets, wherein a resource set, of the plurality of resource sets, includes one or more type-0 resources and one or more type-1 resources, wherein the one or more type-0 resources are configured with a single transmission configuration indicator (TCI) state and the one or more type-1 resources are configured with at least two TCI states; identifying, based at least in part on the type-0 resources and the type-1 resources, a plurality of hypotheses; identifying, based at least in part on the type-0 resources, the type-1 resources, and the plurality of hypotheses, a set of hypothesis groups, wherein the plurality of hypotheses are divided into the set of hypothesis groups; and reporting, to one or more transmit receive points (TRPs) and for the set of hypothesis groups, a set of channel state information (CSIs) corresponding to the set of hypothesis groups.

In some aspects, a UE for wireless communication may include a memory and one or more processors operatively coupled to the memory. The memory and the one or more processors may be configured to identify a plurality of resource sets, wherein a resource set, of the plurality of resource sets, includes one or more type-0 resources and one or more type-1 resources, wherein the one or more type-0 resources are configured with a single TCI state and the one or more type-1 resources are configured with at least two TCI states; identify, based at least in part on the type-0 resources and the type-1 resources, a plurality of hypotheses; identify, based at least in part on the type-0 resources, the type-1 resources, and the plurality of hypotheses, a set of hypothesis groups, wherein the plurality of hypotheses are divided into the set of hypothesis groups; and report, to one or more TRPs and for the set of hypothesis groups, a set of CSIs corresponding to the set of hypothesis groups.

In some aspects, a non-transitory computer-readable medium may store one or more instructions for wireless communication. The one or more instructions, when executed by one or more processors of a UE, may cause the one or more processors to identify a plurality of resource sets, wherein a resource set, of the plurality of resource sets, includes one or more type-0 resources and one or more type-1 resources, wherein the one or more type-0 resources are configured with a single TCI state and the one or more type-1 resources are configured with at least two TCI states; identify, based at least in part on the type-0 resources and the type-1 resources, a plurality of hypotheses; identify, based at least in part on the type-0 resources, the type-1 resources, and the plurality of hypotheses, a set of hypothesis groups, wherein the plurality of hypotheses are divided into the set of hypothesis groups; and report, to one or more TRPs and for the set of hypothesis groups, a set of CSIs corresponding to the set of hypothesis groups.

In some aspects, an apparatus for wireless communication may include means for identifying a plurality of resource sets, wherein a resource set, of the plurality of resource sets, includes one or more type-0 resources and one or more type-1 resources, wherein the one or more type-0 resources are configured with a single TCI state and the one or more type-1 resources are configured with at least two TCI states; means for identifying, based at least in part on the type-0 resources and the type-1 resources, a plurality of hypotheses; means for identifying, based at least in part on the type-0 resources, the type-1 resources, and the plurality of hypotheses, a set of hypothesis groups, wherein the plurality of hypotheses are divided into the set of hypothesis groups; and means for reporting, to one or more TRPs and for the set of hypothesis groups, a set of CSIs corresponding to the set of hypothesis groups.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
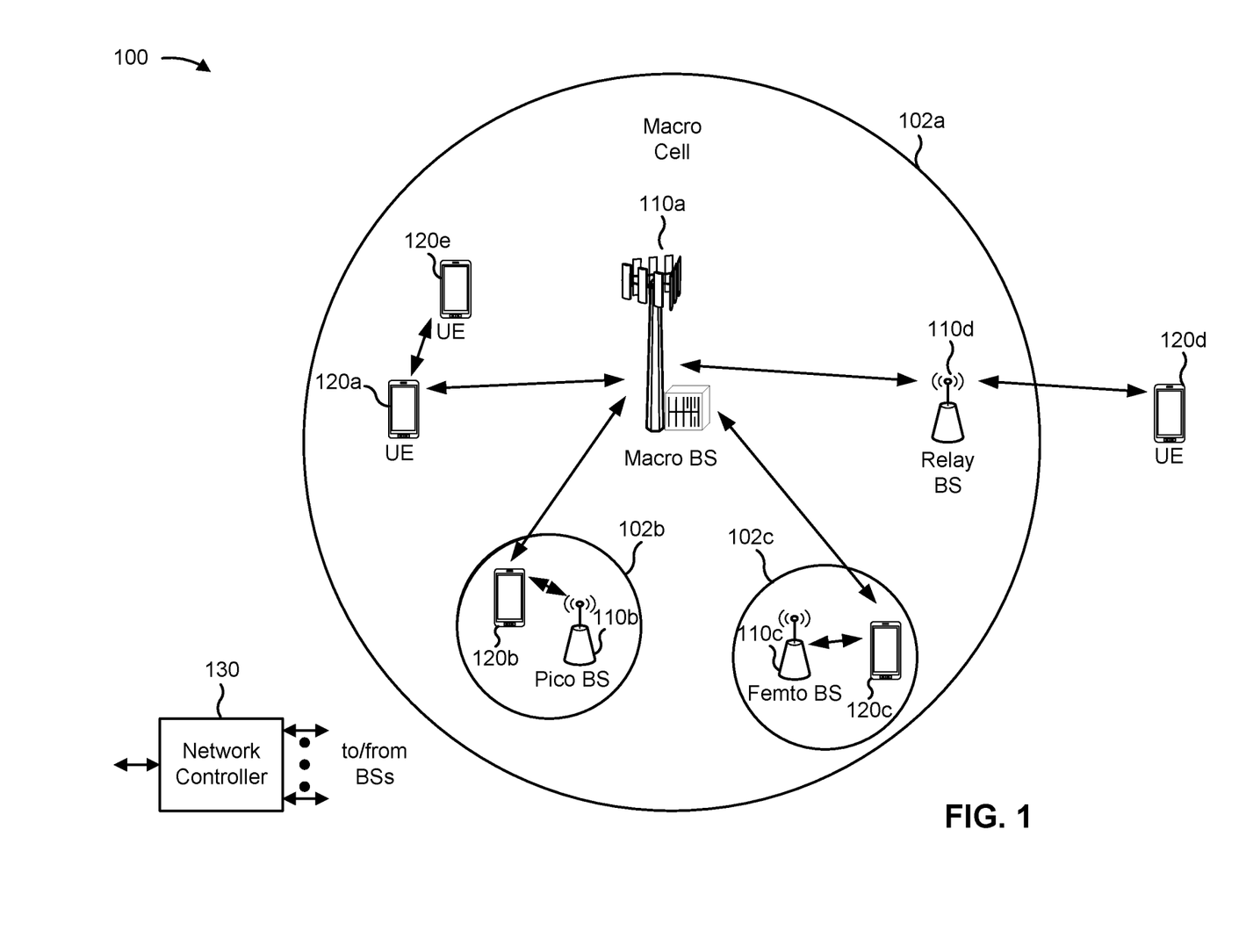
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
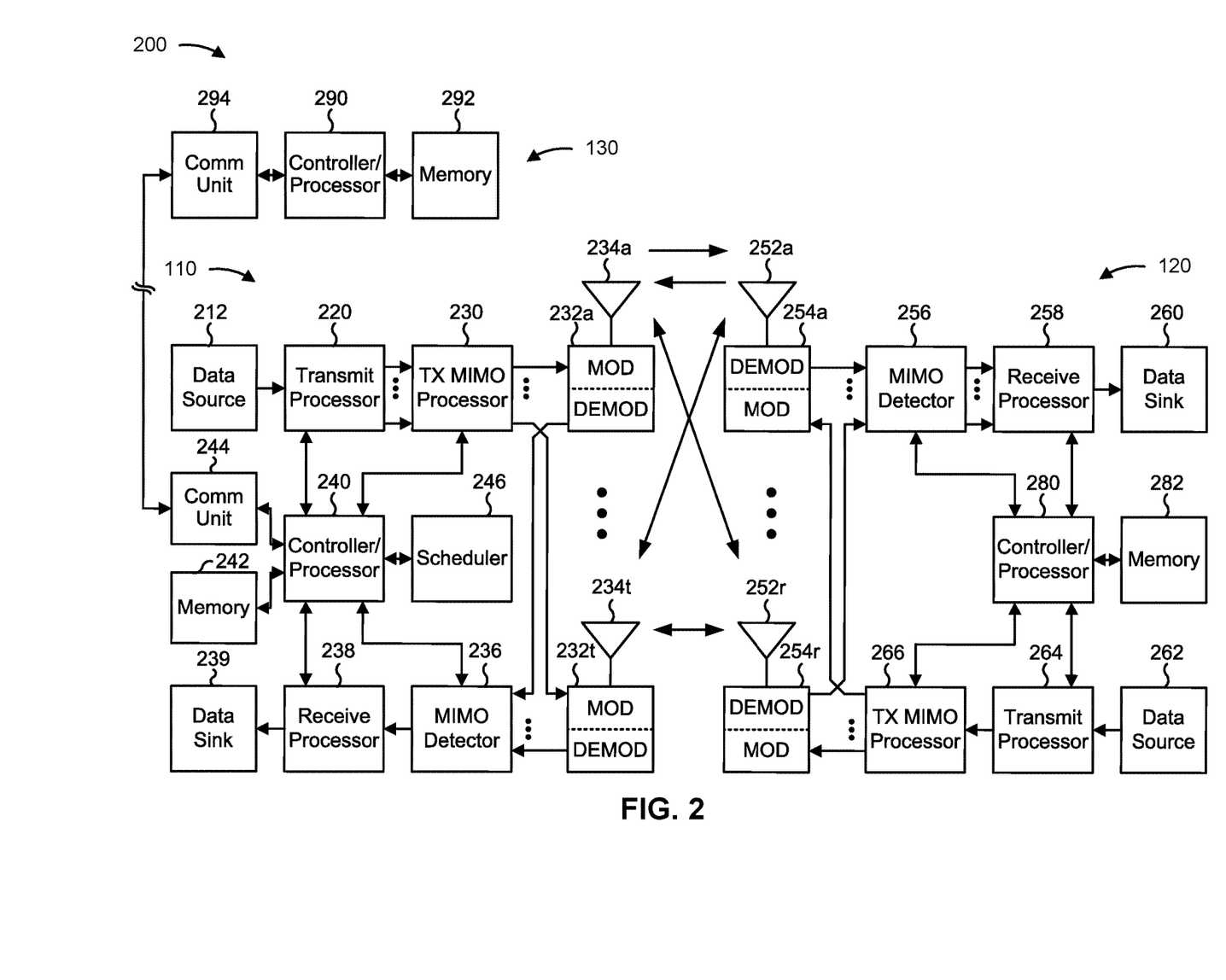
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with port group pairing for channel state information (CSI) in multi-TRP deployments, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink.

In some aspects, UE 120 may include means for identifying a plurality of resource sets, wherein a resource set, of the plurality of resource sets, includes one or more type-0 resources and one or more type-1 resources, wherein the one or more type-0 resources are configured with a single TCI state and the one or more type-1 resources are configured with at least two TCI states; means for identifying, based at least in part on the type-0 resources and the type-1 resources, a plurality of hypotheses; means for identifying, based at least in part on the type-0 resources, the type-1 resources, and the plurality of hypotheses, a set of hypothesis groups, wherein the plurality of hypotheses are divided into the set of hypothesis groups; and means for reporting, to one or more TRPs and for the set of hypothesis groups, a set of CSIs corresponding to the set of hypothesis groups; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, a UE may communicate in a multi-TRP deployment. For example, the UE may communicate with a first TRP, a second TRP, and/or the like, which may enable improved throughput, reliability, coverage, and/or the like. The UE may provide a channel state information (CSI) report. The CSI report may be periodic, semi-persistent, or aperiodic. The CSI report may be based on CSI reference signal (RS) resources and interference measurement (IM) resources that are configured for the UE. The CSI may include a channel quality indicator (CQI), a precoding matrix indicator (PMI), a CSI RS resource indicator (CRI), a synchronization signal (SS)/physical broadcast channel (PBCH) block resource indicator (SSBRI), a layer indicator (LI), a rank indicator (RI) and/or a layer 1 (L1) reference signal received power (RSRP) (L1-RSRP) indicator.

As part of the CSI report, the UE may also provide a CRI to identify CSI RS resources that are used for the reported CSI. For example, the UE may provide a CRI, in connection with CSI feedback, that identifies a channel measurement resource (CMR). Each value of the CRI (which may be termed a CRI codepoint) may identify a hypothesis for which the UE reports a CSI. When the UE is connected to a plurality of TRPs, the UE may support a single CSI from a single TRP. The UE may receive independent CSI reports from each TRP via a separate report configuration. Similarly, the UE may use dynamic point selection for the CSI reports, whereby each identified resource is associated with a particular transmission configuration indicator (TCI) state corresponding to a particular TRP. However, such configurations may result in relatively static channel and/or interference hypothesis evaluation.

A new CSI framework may enable the UE to select and report a preferred TRP or TRP pair. In such a CSI framework, report configuration may identify a noncoherent joint transmission (NCJT) hypothesis corresponding to a port group pair associated with a common resource for channel measurement denoted by a type-1 resource. In this case, each port group of the port group pair may be associated with a single TCI state (the resource is associated with two TCI states). In some cases, each resource may be associated with a single TCI state corresponding to a single port group (e.g., not configured with a port group pair). Such resources may be denoted by type-0 resources. The RI may include a first rank indicator to identify single TRP operation (e.g., RI values greater than 1 for a first port group and an RI value of 0 for a second port group) and a second rank indicator to identify multi-TRP operation (e.g., a RI value of greater than 0 for both port groups).

Some aspects described herein enable hypothesis grouping for multi-TRP CSI in cases where port groups are paired. For example, a UE may identify a first group of type-0 resources and a second group of type-1 resources. In this case, the type-0 resources may be associated with a single TCI state and the type-1 resources may be associated with at least two TCI states. The UE may identify hypotheses for the first group of type-0 resources and the second group of type-1 resources and may group the hypotheses into one or more hypothesis groups. In this case, the UE may evaluate hypotheses of the one or more hypothesis groups and may report a set of CSIs based at least in part on evaluating the hypotheses. In this way, the UE enables dynamic channel and/or interference hypothesis evaluation for NCJT operation, such as in operation on frequency band 1 (FR1) and frequency band 2 (FR2).

Figure 3:
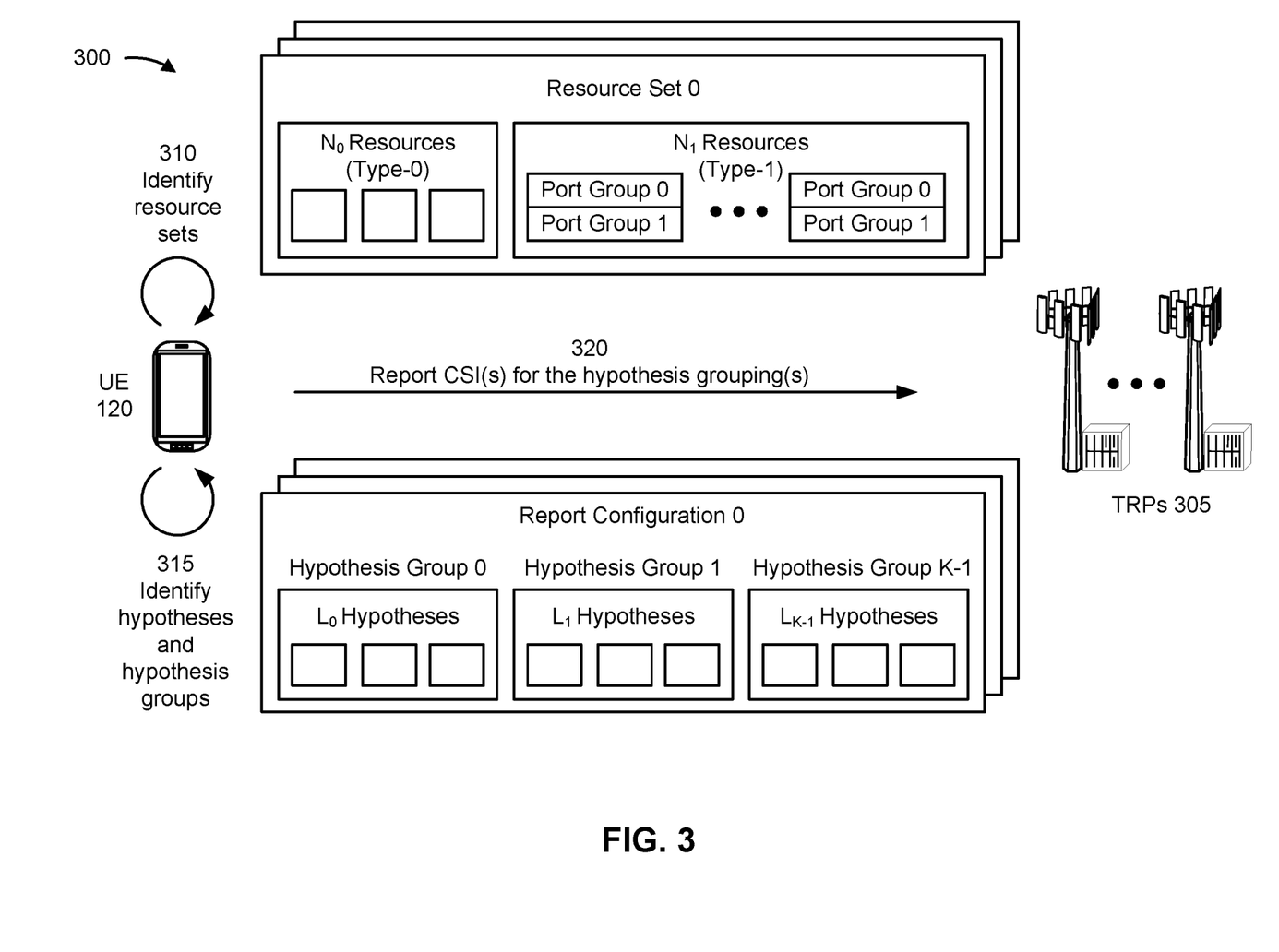
FIG. 3 is a diagram illustrating an example of port group pairing for channel state information in multi-transmit receive point deployments, in accordance with various aspects of the present disclosure.

FIG. 3 is a diagram illustrating an example 300 of port group pairs for CSI in multi-TRP deployments, in accordance with various aspects of the present disclosure. As shown in FIG. 3, example 300 includes a UE 120 and one or more TRPs 305 (e.g., which may correspond to BSs 110). For example, UE 120 may communicate with a first TRP 305, a second TRP 305, and/or the like.

As further shown in FIG. 3, and by reference number 310, UE 120 may identify resource sets. For example, UE 120 may identify one or more resource sets corresponding to TRPs 305 (e.g., a first TRP 305, a second TRP 305, an nth TRP 305, and/or the like). Each resource set may include a first type of resource and a second type of resource. For example, UE 120 may identify a quantity, $N_0$, of type-0 resources in resource set 0 and a quantity, $N_1$, of type-1 resources in resource set 0. In this case, type-0 resources may be configured with a single TCI state (e.g., corresponding to a single port group) and type-1 resources may be configured with a plurality of TCI states (e.g., a first TCI state corresponding to port group 0 and a second TCI state corresponding to port group 1).

As further shown in FIG. 3, and by reference number 315, UE 120 may identify hypotheses (e.g., CSI hypotheses) and hypothesis groups. For example, UE 120 may identify a set of hypotheses to evaluate in order to enable subsequent communication. In some aspects, each resource (e.g., CSI RS or CSI IM resource), of one or more resource sets, may correspond to a hypothesis. For example, UE 120 may identify a single hypothesis (e.g., a single-TRP operation hypothesis) for each of the No type-0 resources of resource set 0 and may identify a single hypothesis (e.g., an NCJT hypothesis) for each of the $N_1$ type-1 resources of resource set 0. In this case, UE 120 may further identify two additional hypotheses (e.g., single-TRP operation hypotheses) corresponding to the two port groups for each of the $N_1$ type-1 resources of resource set 0. As a result, UE 120 may identify a total of $N_0+N_1+2N_1$ hypotheses for resource set 0. In some aspects, UE 120 may determine to exclude the single-TRP operation hypotheses for the type-1 resources. For example, UE 120 may receive radio resource control (RRC) signaling, medium access control (MAC) control element (CE) signaling, and/or the like indicating that type-1 resources are to only have NCJT hypotheses. In this case, UE 120 may identify $N_0+N_1$ total hypotheses for resource set 0.

In some aspects, UE 120 may divide the hypotheses into one or more hypothesis groups. For example, for a total of $N_0+N_1+2N_1=N_0+3N_1$ hypotheses, UE 120 may identify K hypothesis groups where a hypothesis group k (0≤k<K) includes $L_k$ hypotheses, such that:

$$\sum_{k=0}^{K-1} L_k = N_0 + 3N_1 \tag{1}$$

In this case, based at least in part on identifying the hypothesis groups and assigning the hypotheses to the hypothesis groups, UE 120 may evaluate hypotheses of the hypothesis groups. For example, UE 120 may select one or more hypotheses, in each hypothesis group, with a highest spectral efficiency for reporting in a CSI, as discussed herein. In some aspects, UE 120 may determine a quantity of hypotheses to select from each hypothesis group based at least in part on received signaling, a UE capability, and/or the like. Additionally, or alternatively, UE 120 may provide UE capability signaling identifying a maximum quantity of type-0 resources, a maximum quantity of type-1 resources, a combination thereof, and/or the like. Similarly, UE 120 may provide UE capability signaling identifying a maximum quantity of active hypotheses or hypotheses groups and associated CSIs.

In some aspects, UE 120 may determine a quantity of hypothesis groups and divide the hypotheses into the quantity of hypothesis groups. For example, UE 120 may select a single hypothesis group. In this case, UE 120 may report one or more best hypotheses (with respect to spectral efficiency) from all single-TRP operation and multi-TRP operation hypotheses. Alternatively, UE 120 may select a pair of hypothesis groups. For example, UE 120 may divide the hypotheses into a first hypothesis group for single-TRP hypotheses (e.g., the No hypotheses corresponding to the type-0 resources and the $2N_1$ hypotheses corresponding to port groups of the type-1 resources) and a second hypothesis group for the multi-TRP hypotheses (e.g., the $N_1$ hypotheses of the type-1 resources). In this case, UE 120 may report one or more CSIs for one or more best hypotheses from the first hypothesis group (e.g., one or more single-TRP hypotheses) and one or more CSIs for one or more best hypotheses from the second hypothesis group (e.g., one or more multi-TRP hypotheses).

Alternatively, UE 120 may select three hypothesis groups. In this case, UE 120 may divide the hypotheses into a first hypothesis group for single-TRP hypotheses of the type-0 resources, a second hypothesis group for multi-TRP hypotheses of the type-1 resources, and a third hypothesis group for single-TRP hypotheses of the type-1 resources. Alternatively, UE 120 may select a quantity of hypothesis groups based at least in part on a quantity of hypotheses (e.g., $1+N_1$) hypothesis groups. In this case, UE 120 may divide the hypotheses into a first hypothesis group including single-TRP hypotheses of the type-0 resources and $N_1$ hypothesis groups corresponding to each type-1 resource (e.g., each of the $N_1$ hypothesis groups includes a multi-TRP hypothesis for a type-1 resource and a pair of single-TRP hypotheses for the type-1 resource). In this case, UE 120 may report one or more CSIs for the type-0 resources and one or more CSIs for each of the type-1 resources.

In some aspects, UE 120 may receive signaling configuring the hypothesis grouping. For example, UE 120 may receive RRC signaling, MAC CE signaling, and/or the like indicating that UE 120 is to divide the hypotheses into a particular quantity, K, of hypothesis groups. In some aspects, UE 120 may assign a hypothesis to a plurality of hypothesis groups.

As further shown in FIG. 3, and by reference number 320, UE 120 may report one or more CSIs for one or more hypothesis groups. For example, UE 120 may report a CSI for each hypothesis group. In some aspects, UE 120 may report a CSI based at least in part on evaluating hypotheses of each hypothesis group. For example, UE 120 may identify a hypothesis with a highest spectral efficiency among hypotheses of a hypothesis group and may report the hypothesis in a CSI for the hypothesis group. Additionally, or alternatively, UE 120 may report a plurality of hypotheses from a hypothesis group. For example, UE 120 may report a threshold quantity of hypotheses with, for example, highest spectral efficiencies within a hypothesis group. In this case, UE 120 may configure the threshold quantity based at least in part on a UE capability, a type of hypothesis group that is configured, and/or the like.

In some aspects, UE 120 may provide a CRI in connection with CSI reporting for one or more hypotheses. For example, UE 120 may provide a CRI that uniquely maps to a particular hypothesis. In this case, UE 120 may generate a CRI with a value determined based at least in part on a resource index of a hypothesis (e.g., for the single-TRP hypotheses associated with the type-0 resources and the multi-TRP hypotheses associated with the type-1 resources) with a hypothesis group. Similarly, UE 120 may generate a CRI for other hypotheses (e.g., single-TRP hypotheses associated with type-1 resources) based at least in part on a sequential numbering based at least in part on associated resources and based at least in part on a port group. Alternatively, the CRI may map to a hypothesis such that the CRI is based at least in part on the resource index for type-0 resource hypotheses and based at least in part on a sequential numbering for type-1 resource hypotheses. In some aspects, UE 120 may determine the CRI based at least in part on a numbering among active hypotheses. For example, UE 120 may receive signaling identifying a subset of hypotheses as active or inactive and may evaluate the active hypotheses and forgo evaluation of the inactive hypotheses. Similarly, UE 120 may forgo evaluation of inactive hypothesis groups.

In some aspects, the CRI may be defined implicitly based at least in part on a resource group and/or hypothesis group. For example, UE 120 may determine the CRI based at least in part on a hypothesis identifier that is unique to each possible hypothesis. Additionally, or alternatively, UE 120 may determine the CRI based at least in part on a hypothesis identifier that is unique to each active hypothesis. Additionally, or alternatively, UE 120 may determine the CRI based at least in part on a hypothesis group. For example, within a hypothesis group, hypotheses may have unique identifiers, and the CRI may correspond to a particular hypothesis within the hypothesis group. In some aspects, the CRI may be defined explicitly using signaling. For example, UE 120 may receive RRC signaling, MAC CE signaling, and/or the like identifying a CRI to hypothesis mapping, a set of hypothesis identifiers, and/or the like. Additionally, or alternatively, UE 120 may receive a MAC CE (e.g., a hypothesis activation or deactivation MAC CE) that defines a CRI to hypothesis mapping.

As indicated above, FIG. 3 is provided as an example. Other examples may differ from what is described with respect to FIG. 3.

Figure 4:
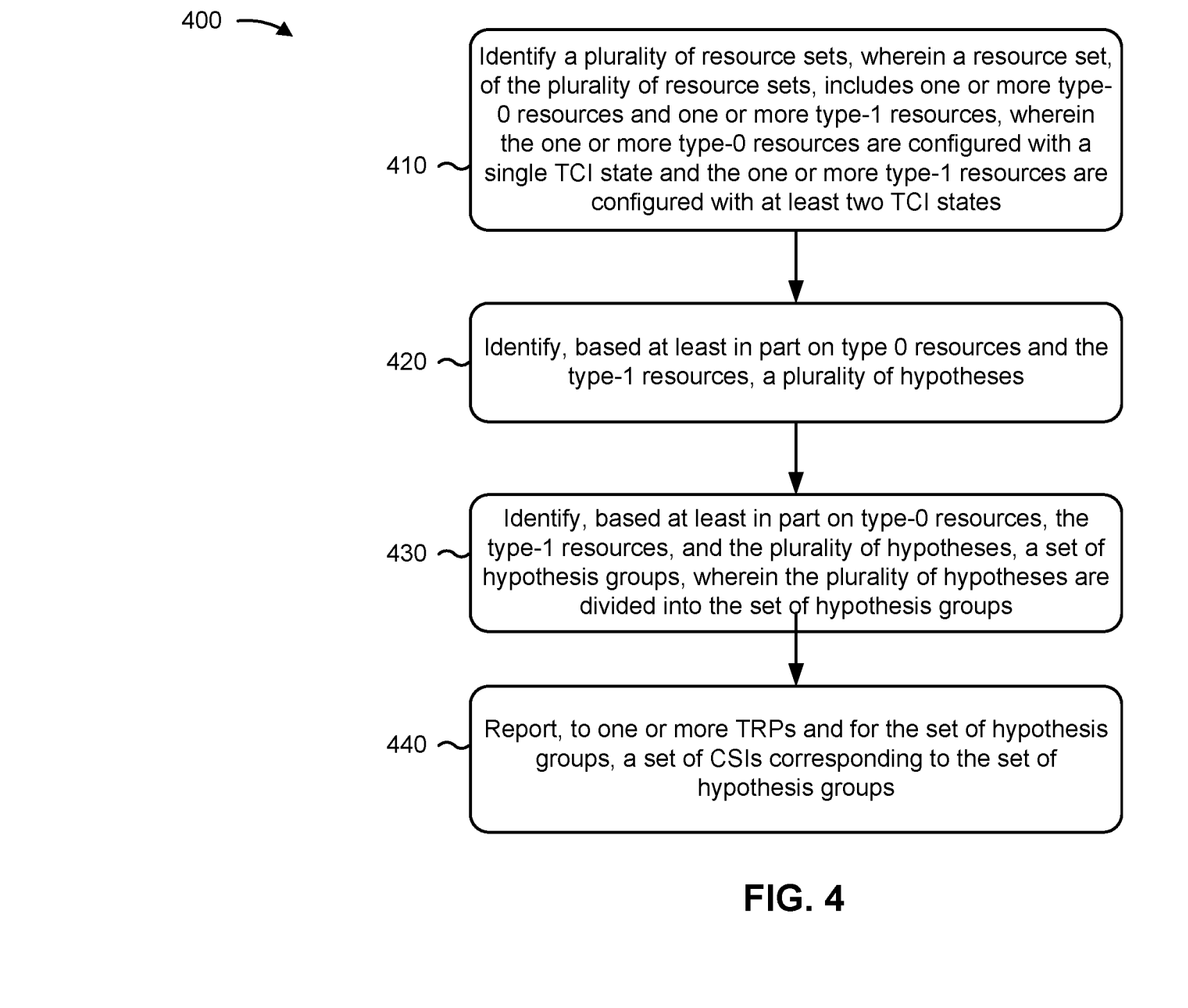
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs port group pairing for CSI in multi-TRP deployments.

As shown in FIG. 4, in some aspects, process 400 may include identifying a plurality of resource sets, wherein a resource set, of the plurality of resource sets, includes one or more type-0 resources and one or more type-1 resources, wherein the one or more type-0 resources are configured with a single TCI state and the one or more type-1 resources are configured with at least two TCI states (block 410). For example, the UE (e.g., using receive processor 258, transmit processor 264, controller/processor 280, memory 282, and/or the like) may identify a plurality of resource sets, wherein a resource set, of the plurality of resource sets, includes one or more type-0 resources and one or more type-1 resources, as described above. In some aspects, the one or more type-0 resources are configured with a single TCI state and the one or more type-1 resources are configured with at least two TCI states.

As shown in FIG. 4, in some aspects, process 400 may include identifying, based at least in part on the type-0 resources and the type-1 resources, a plurality of hypotheses (block 420). For example, the UE (e.g., using receive processor 258, transmit processor 264, controller/processor 280, memory 282, and/or the like) may identify, based at least in part on the type-0 resources and the type-1 resources, a plurality of hypotheses, as described above.

As shown in FIG. 4, in some aspects, process 400 may include identifying, based at least in part on the type-0 resources, the type-1 resources, and the plurality of hypotheses, a set of hypothesis groups, wherein the plurality of hypotheses are divided into the set of hypothesis groups (block 430). For example, the UE (e.g., using receive processor 258, transmit processor 264, controller/processor 280, memory 282, and/or the like) may identifying, based at least in part on the type-0 resources, the type-1 resources, and the plurality of hypotheses, a set of hypothesis groups, as described above. In some aspects, the plurality of hypotheses are divided into the set of hypothesis groups.

As shown in FIG. 4, in some aspects, process 400 may include reporting, to one or more transmit receive points (TRPs) and for the set of hypothesis groups, a set of channel state information (CSIs) corresponding to the set of hypothesis groups (block 440). For example, the UE (e.g., using receive processor 258, transmit processor 264, controller/processor 280, memory 282, and/or the like) may report, to one or more TRPs and for the set of hypothesis groups, a set of CSIs corresponding to the set of hypothesis groups, as described above.

Process 400 may include additional aspects, such as any single aspect and/or any combination of aspects described below and/or in connection with one or more other processes described elsewhere herein.

In a first aspect, identifying the plurality of hypotheses includes identifying a single TCI state hypothesis for each type-0 resource, a multiple TCI state hypothesis for each type-1 resource, and a pair of single TCI state hypotheses for each type-1 resource.

In a second aspect, alone or in combination with the first aspect, identifying the plurality of hypotheses includes selectively including the pair of single TCI state hypotheses for each type-1 resource in the plurality of hypotheses based at least in part on received signaling.

In a third aspect, alone or in combination with one or more of the first and second aspects, the type-0 resources are not configured with a plurality of port groups and the type-1 resources are configured with a plurality of port groups.

In a fourth aspect, alone or in combination with one or more of the first through third aspects, the plurality of resource sets are a plurality of CSI RS resource sets or CSI IM resource sets.

In a fifth aspect, alone or in combination with one or more of the first through fourth aspects, a CSI, of the set of CSIs, identifies a hypothesis, of a hypothesis group, of the set of hypothesis groups, with a highest spectral efficiency among one or more hypotheses of the hypothesis group.

In a sixth aspect, alone or in combination with one or more of the first through fifth aspects, a CSI, of the set of CSIs, identifies a threshold quantity of hypotheses, of a hypothesis group, of the set of hypothesis groups, with a highest spectral efficiency among one or more hypotheses of the hypothesis group.

In a seventh aspect, alone or in combination with one or more of the first through sixth aspects, the threshold quantity is based at least in part on a UE capability.

In an eighth aspect, alone or in combination with one or more of the first through seventh aspects, identifying the set of hypothesis groups includes assigning the plurality of hypotheses to a single hypothesis group.

In a ninth aspect, alone or in combination with one or more of the first through eighth aspects, identifying the set of hypothesis groups includes assigning a first subset of the plurality of hypotheses to a first hypothesis group, wherein the first subset of the plurality of hypotheses correspond to hypotheses associated with a single TCI state; and assigning a second subset of the plurality of hypotheses to a second hypothesis group, wherein the second subset of the plurality of hypotheses correspond to hypotheses associated with a plurality of TCI states.

In a tenth aspect, alone or in combination with one or more of the first through ninth aspects, identifying the set of hypothesis groups includes assigning a first subset of the plurality of hypotheses to a first hypothesis group, wherein the first subset of the plurality of hypotheses correspond to hypotheses associated with a single TCI state; assigning a second subset of the plurality of hypotheses to a second hypothesis group, wherein the second subset of the plurality of hypotheses correspond to hypotheses associated with a plurality of TCI states; and assigning a third subset of the plurality of hypotheses to a third hypothesis group, wherein the third subset of the plurality of hypotheses correspond to hypotheses associated with a plurality of TCI states.

In an eleventh aspect, alone or in combination with one or more of the first through tenth aspects, identifying the set of hypothesis groups includes assigning a first subset of the plurality of hypotheses to a first hypothesis group, of the set of hypothesis groups, wherein the first subset of the plurality of hypotheses correspond to hypotheses associated with a single TCI state; and assigning a second subset of the plurality of hypotheses to one or more second hypothesis groups, wherein the second subset of the plurality of hypotheses correspond to hypotheses associated with a plurality of TCI states, wherein each of hypothesis group, of the one or more second hypothesis groups, is associated with a single type-1 resource.

In a twelfth aspect, alone or in combination with one or more of the first through eleventh aspects, reporting the set of CSIs includes reporting a CRI identifying a selected hypothesis.

In a thirteenth aspect, alone or in combination with one or more of the first through twelfth aspects, the CRI is defined based at least in part on a hypothesis identifier, and the hypothesis identifier is based at least in part on a sequence of hypotheses, a hypothesis group, whether a hypothesis group is active, a resource type, or a port group.

In a fourteenth aspect, alone or in combination with one or more of the first through thirteenth aspects, the CRI is defined based at least in part on received signaling.

In a fifteenth aspect, alone or in combination with one or more of the first through fourteenth aspects, the received signaling is radio resource control signaling or MAC CE signaling.

In a sixteenth aspect, alone or in combination with one or more of the first through fifteenth aspects, process 400 includes transmitting UE capability signaling, and the UE capability signaling includes information identifying a supported quantity of type-0 resources, a supported quantity of type-1 resources, a supported quantity of active hypotheses, or a supported quantity of active hypothesis groupings.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying a plurality of resource sets, wherein a resource set, of the plurality of resource sets, includes one or more type-0 resources and one or more type-1 resources, wherein the one or more type-0 resources are configured with a single transmission configuration indicator (TCI) state and the one or more type-1 resources are configured with at least two TCI states;
    identifying, based at least in part on the type-0 resources and the type-1 resources, a plurality of hypotheses;
    identifying, based at least in part on the type-0 resources, the type-1 resources, and the plurality of hypotheses, a set of hypothesis groups, wherein the plurality of hypotheses are divided into the set of hypothesis groups; and
    reporting, to one or more transmit receive points (TRPs) and for the set of hypothesis groups, a set of channel state information (CSIs) corresponding to the set of hypothesis groups.

2. The method of claim 1, wherein identifying the plurality of hypotheses comprises:
    identifying a single TCI state hypothesis for each type-0 resource, a multiple TCI state hypothesis for each type-1 resource, and a pair of single TCI state hypotheses for each type-1 resource.

3. The method of claim 2, wherein identifying the plurality of hypotheses comprises:
    selectively including the pair of single TCI state hypotheses for each type-1 resource in the plurality of hypotheses based at least in part on received signaling.

4. The method of claim 1, wherein the type-0 resources are not configured with a plurality of port groups and the type-1 resources are configured with a plurality of port groups.

5. The method of claim 1, wherein the plurality of resource sets are a plurality of CSI reference signal (RS) resource sets or CSI interference measurement (IM) resource sets.

6. The method of claim 1, wherein a CSI, of the set of CSIs, identifies a hypothesis, of a hypothesis group, of the set of hypothesis groups, with a highest spectral efficiency among one or more hypotheses of the hypothesis group.

7. The method of claim 1, wherein a CSI, of the set of CSIs, identifies a threshold quantity of hypotheses, of a hypothesis group, of the set of hypothesis groups, with a highest spectral efficiency among one or more hypotheses of the hypothesis group.

8. The method of claim 7, wherein the threshold quantity is based at least in part on a UE capability.

9. The method of claim 1, wherein identifying the set of hypothesis groups comprises:
    assigning the plurality of hypotheses to a single hypothesis group.

10. The method of claim 1, wherein identifying the set of hypothesis groups comprises:
    assigning a first subset of the plurality of hypotheses to a first hypothesis group,
        wherein the first subset of the plurality of hypotheses correspond to hypotheses associated with a single TCI state; and
    assigning a second subset of the plurality of hypotheses to a second hypothesis group,
        wherein the second subset of the plurality of hypotheses correspond to hypotheses associated with a plurality of TCI states.

11. The method of claim 1, wherein identifying the set of hypothesis groups comprises:
    assigning a first subset of the plurality of hypotheses to a first hypothesis group,
        wherein the first subset of the plurality of hypotheses correspond to hypotheses associated with a single TCI state;
    assigning a second subset of the plurality of hypotheses to a second hypothesis group,
        wherein the second subset of the plurality of hypotheses correspond to hypotheses associated with a plurality of TCI states; and
    assigning a third subset of the plurality of hypotheses to a third hypothesis group,
        wherein the third subset of the plurality of hypotheses correspond to hypotheses associated with a plurality of TCI states.

12. The method of claim 1, wherein identifying the set of hypothesis groups comprises:
    assigning a first subset of the plurality of hypotheses to a first hypothesis group, of the set of hypothesis groups,
        wherein the first subset of the plurality of hypotheses correspond to hypotheses associated with a single TCI state; and
    assigning a second subset of the plurality of hypotheses to one or more second hypothesis groups,
        wherein the second subset of the plurality of hypotheses correspond to hypotheses associated with a plurality of TCI states,
        wherein each of hypothesis group, of the one or more second hypothesis groups, is associated with a single type-1 resource.

13. The method of claim 1, wherein reporting the set of CSIs comprises:
    reporting a CSI reference signal (RS) resource indicator (CRI) identifying a selected hypothesis.

14. The method of claim 13, wherein the CRI is defined based at least in part on a hypothesis identifier, and
    wherein the hypothesis identifier is based at least in part on:
        a sequence of hypotheses,
        a hypothesis group,
        whether a hypothesis group is active,
        a resource type, or
        a port group.

15. The method of claim 13, wherein the CRI is defined based at least in part on received signaling.

16. The method of claim 15, wherein the received signaling is radio resource control signaling or medium access control (MAC) control element signaling.

17. The method of claim 1, further comprising:
    transmitting UE capability signaling,
        wherein the UE capability signaling includes information identifying:
            a supported quantity of type-0 resources, a supported quantity of type-1 resources,
a supported quantity of active hypotheses, or
a supported quantity of active hypothesis groupings.

18. A user equipment (UE) for wireless communication, comprising:
a memory; and
one or more processors operatively coupled to the memory, the memory and the one or more processors configured to:
identify a plurality of resource sets, wherein a resource set, of the plurality of resource sets, includes one or more type-0 resources and one or more type-1 resources, wherein the one or more type-0 resources are configured with a single transmission configuration indicator (TCI) state and the one or more type-1 resources are configured with at least two TCI states;
identify, based at least in part on the type-0 resources and the type-1 resources, a plurality of hypotheses;
identify, based at least in part on the type-0 resources, the type-1 resources, and the plurality of hypotheses, a set of hypothesis groups, wherein the plurality of hypotheses are divided into the set of hypothesis groups; and
report, to one or more transmit receive points (TRPs) and for the set of hypothesis groups, a set of channel state information (CSIs) corresponding to the set of hypothesis groups.

19. A non-transitory computer-readable medium storing one or more instructions for wireless communication, the one or more instructions comprising:
one or more instructions that, when executed by one or more processors of a user equipment (UE), cause the one or more processors to:
identify a plurality of resource sets, wherein a resource set, of the plurality of resource sets, includes one or more type-0 resources and one or more type-1 resources, wherein the one or more type-0 resources are configured with a single transmission configuration indicator (TCI) state and the one or more type-1 resources are configured with at least two TCI states;
identify, based at least in part on the type-0 resources and the type-1 resources, a plurality of hypotheses;
identify, based at least in part on the type-0 resources, the type-1 resources, and the plurality of hypotheses, a set of hypothesis groups, wherein the plurality of hypotheses are divided into the set of hypothesis groups; and
report, to one or more transmit receive points (TRPs) and for the set of hypothesis groups, a set of channel state information (CSIs) corresponding to the set of hypothesis groups.

20. An apparatus for wireless communication, comprising:
means for identifying a plurality of resource sets, wherein a resource set, of the plurality of resource sets, includes one or more type-0 resources and one or more type-1 resources, wherein the one or more type-0 resources are configured with a single transmission configuration indicator (TCI) state and the one or more type-1 resources are configured with at least two TCI states;
means for identifying, based at least in part on the type-0 resources and the type-1 resources, a plurality of hypotheses;
means for identifying, based at least in part on the type-0 resources, the type-1 resources, and the plurality of hypotheses, a set of hypothesis groups, wherein the plurality of hypotheses are divided into the set of hypothesis groups; and
means for reporting, to one or more transmit receive points (TRPs) and for the set of hypothesis groups, a set of channel state information (CSIs) corresponding to the set of hypothesis groups.

* * * * *